Figure 1:
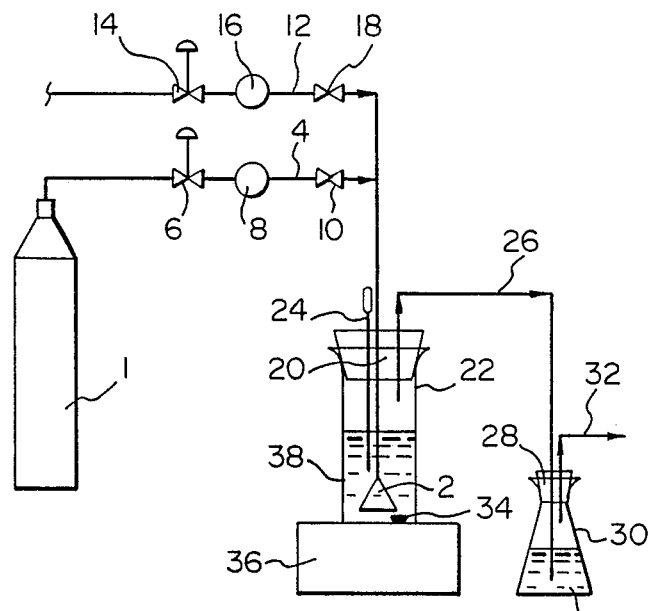

United States Patent [19]

Palmer

[11] Patent Number: 4,867,961
[45] Date of Patent: Sep. 19, 1989

[54] METHOD OF REMOVING SULPHUR DIOXIDE FROM A GASEOUS STREAM

[76] Inventor: Joseph Palmer, 447 Millar Street, Gatineau, Quebec, Canada, J8P 5B2

[21] Appl. No.: 160,699

[22] Filed: Feb. 26, 1988

[30] Foreign Application Priority Data

Mar. 23, 1987 [CA] Canada .................................. 533248

[51] Int. Cl.⁴ ............................................. C01B 17/98
[52] U.S. Cl. .................................... 423/522; 423/497; 423/554; 423/242
[58] Field of Search .................... 423/242 A, 522, 497, 423/554

[56] References Cited

U.S. PATENT DOCUMENTS

| | | | |
|---|---|---|---|
| 1,977,560 | 10/1934 | Martin | 423/554 |
| 2,676,090 | 4/1954 | Johnstone | 423/242 A |
| 3,251,649 | 5/1966 | Atsukawa et al. | 423/244 R |
| 3,301,633 | 1/1967 | Stowe et al. | 423/497 |
| 3,525,587 | 8/1970 | Browder, Jr. | 423/522 |
| 3,556,722 | 1/1971 | Owaki et al. | 423/242 A |
| 3,607,001 | 9/1971 | Finfer et al. | 423/242 A |
| 4,046,856 | 9/1977 | Itoo et al. | 423/242 A |

FOREIGN PATENT DOCUMENTS

| | | | |
|---|---|---|---|
| 767027 | 10/1980 | U.S.S.R. | 423/497 |
| 708095 | 4/1954 | United Kingdom | 423/242 A |

OTHER PUBLICATIONS

CRC, "Handbook of Chemistry and Physics", 43 Edition, Hogman Editor, Chemical Rubber Publishing Co., Cleveland Ohio, p. 1726.
John C. Mathews et al., SO₂ Control Processes for Non-Ferrous Smelters, *Research Triangle Institute*, NTIS Report PB 251 409, 1976.

*Primary Examiner*—John Doll
*Assistant Examiner*—Robert M. Kunemund
*Attorney, Agent, or Firm*—Francis W. Lemon

[57] ABSTRACT

Capture-fixation of $SO_2$ from flue and non-ferrous smelter gases is achieved with the use of MgO aqueous slurry as an absorbing medium. During the absorption, most of the MgO is converted to $MgSO_4$ and the rest is solubilized as $MgSO_3$ and $Mg(HSO_3)_2$. The clear solution obtained at the end of the absorption is brought to about 40° C. and is treated with sulphuric acid in an amount representing at least 5% in excess of the stoichiometric requirement whereby sulphite and bisulphite of magnesium are converted to magnesium sulphate. The magnesium sulphate obtained above can be used in a two stage addition of potassium chloride to obtain magnesium chloride, and calcined dolomite added to the remainder whereby magnesium hydroxide is precipitated and may be filtered off from the resulting $CaCl_2$ solution. The process provides a means of removing $SO_2$ from flue and smelter gases and at the same time produces industrially important chemical products ($SO_2$, $H_2SO_4$, $K_2SO_4$, MgO, $CaCl_2$).

9 Claims, 3 Drawing Sheets

METHOD OF REMOVING SULPHUR DIOXIDE FROM A GASEOUS STREAM

This invention relates to a method of removing sulphur dioxide from a gaseous stream.

It is well known to remove sulphur dioxide from waste gas using an aqueous slurry of magnesium oxide having a pH greater than 6 to produce insoluble $MgSO_3$, see for example Mathews, J. C. et al. "$SO_2$ control process for non-ferrous smelters"; Research Triangle Institute, distributed by NTIS as *Report* PB-251-409; 1976, pages 95 and 98.

While this known process is useful, it would be advantageous to provide a method of removing sulphur dioxide from waste gases wherein industrially important chemical products result from the process.

According to the present invention there is provided a method of removing sulphur dioxide ($SO_2$) from a gaseous stream, comprising:

(a) contacting the gaseous stream with an aqueous slurry of magnesium oxide (MgO) containing about 3 to 10%/w of magnesium oxide, so that $SO_2$ of the gaseous stream is absorbed by the aqueous slurry by converting MgO to an aqueous solution at a pH in the range of about 4.0 to 4.5 containing $MgSO_4$ and different smaller amounts of $Mg(HSO_3)_2$, $H_2SO_3$ and water soluble $MgSO_3$, and (b) thoroughly mixing sulphuric acid ($H_2SO_4$) with the aqueous solution, at a $H_2SO_3$ decomposition temperature of at least 40° C. to produce $SO_2$ and $H_2O$ therefrom, the sulphuric acid being present, in an amount representing at least 5% in excess of the total stoichiometric requirement of the aqueous solution to decompose $Mg(HSO_3)_2$ and $MgSO_3$ according to the equations:

$$MgSO_3 + H_2SO_4 \rightarrow MgSO_4 + SO_2 + H_2O, \text{ and}$$

$$Mg(HSO_3)_2 + H_2SO_4 \rightarrow MgSO_4 + 2SO_2 H_2O.$$

In some embodiments of the present invention the sulphur dioxide ($SO_2$) produced in step b) is converted to sulphuric acid by catalytic reaction with $H_2O$ and $O_2$ according to the equation:

$$SO_2 + \tfrac{1}{2}O_2 + H_2O \rightarrow H_2SO_4.$$

In other embodiments of the present invention the magnesium sulphate produced in step (b) is converted to magnesium chloride by thoroughly mixing therewith potassium chloride and $H_2O$ according to the following two stage process:

(i) adding potassium chloride to produce the following reaction:

$$2MgSO_4 + 2KCl + 6H_2O \rightarrow K_2SO_4 \cdot 6H_2O + MgCl_2,$$

whereby the potassium sulphate ($K_2SO_4 \cdot MgSO_4 \cdot 6H_2O$), in the form of a double salt, is separated from the aqueous solution of magnesium chloride, and then adding additional potassium chloride to the separated double salt suspended in water to produce the following reaction $$2KCl + K_2SO_4 \cdot MgSO_4.$$
$$6H_2O \rightarrow 2K_2SO_4 + MgCl_2 + 6H_2O,$$

then separating the $K_2SO_4$, which has crystallized from the solution, from the remainder.

Calcined dolomite (CaO.MgO) may be added to the remainder to produce the following reaction:

$$MgCl_2 + CaO \cdot MgO + 2H_2O \rightarrow 2Mg(OH)_2 + CaCl_2$$
(aqueous solution), and the magnesium hydroxide ($Mg(OH)_2$) separated from the calcium chloride ($CaCl_2$) aqueous solution. A portion of the magnesium hydroxide thus separated may be formed into an aqueous slurry and is recycled for use as the aqueous slurry of magnesium hydroxide in step a), and the remaining magnesium hydroxide is calcined to produce MgO therefrom.

Furthermore, a portion of the $H_2O$ may be removed from the calcium chloride ($CaCl_2$) aqueous solution to crystallize calcium chloride in the remaining water, and then the crystallized calcium chloride may be separated from the remaining water and dried.

The step (b) described above may be carried out under a reduced pressure.

Figure 2:
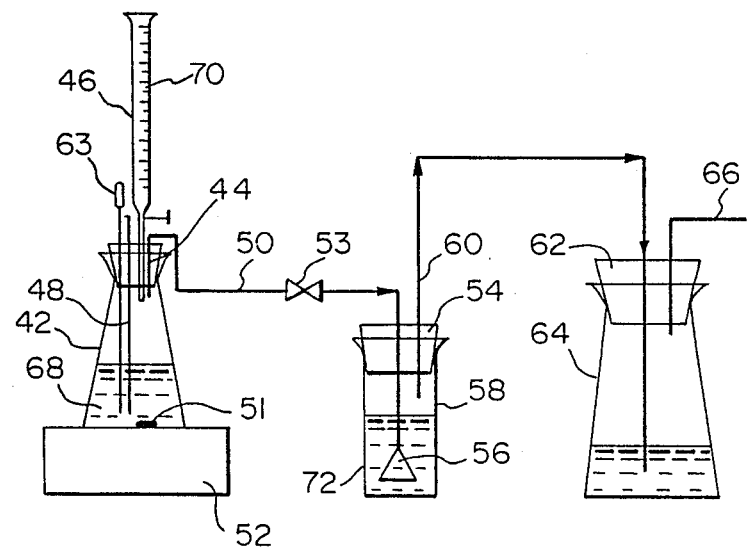
Figure 3:
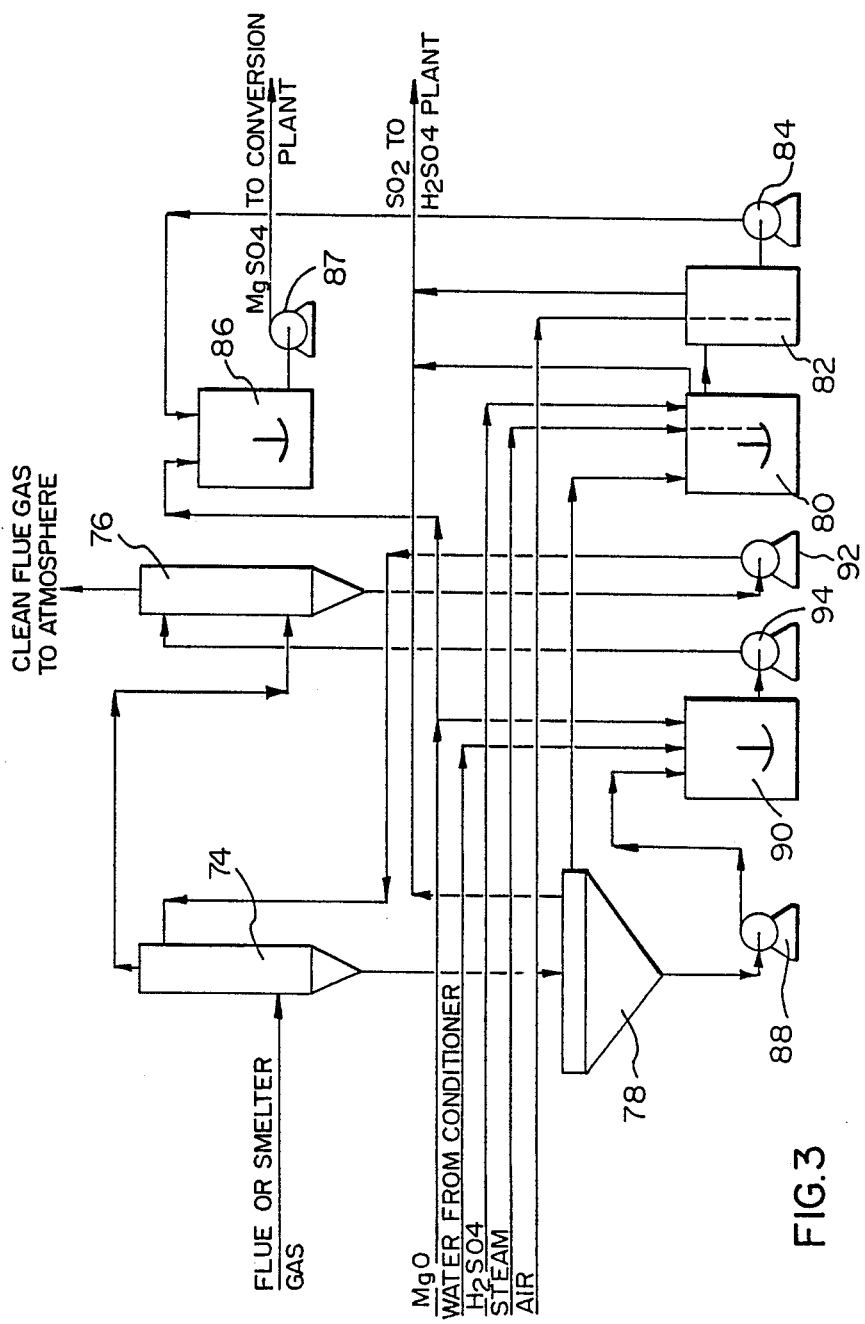
Figure 4:
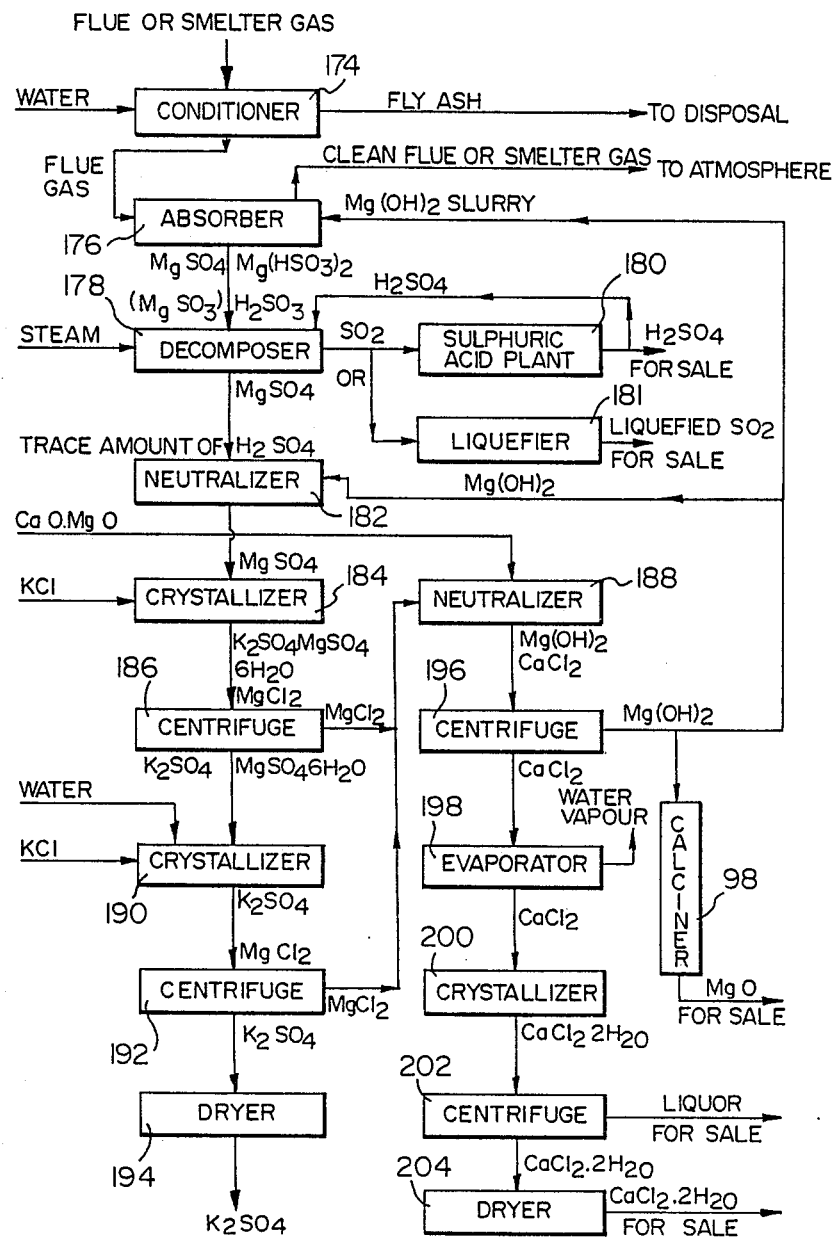

In the accompanying drawings which illustrate, by way of example, embodiments of the present invention, FIGS. 1 and 2 are diagrammatic views of experimental apparatus for removing $SO_2$ from a gaseous stream, FIG. 3 is a mechanical flow diagram for removing $SO_2$ from a gaseous stream on an industrial scale, and FIG. 4 is a flow diagram for an entire industrial process for the removal of $SO_2$ from a gaseous stream and converting $SO_2$ and $MgSO_4$ to different by-products ($H_2SO_4$, MgO, $CaCl_2$).

Referring now to FIG. 1, there is shown a cylinder 1 containing pressurized $SO_2$ connected to a sparger 2 by a tube 4 containing a control valve 6, a flow meter 8 and a check valve 10. A tube 12 containing a control valve 14, flow meter 16 and check valve 18, is connected to the tube 4 for feeding a pressurized source of air (not shown) thereto at a position beyond the check valve 10.

The tube 4 extends through, and seals the sparger 2 in a graduated beaker 22 by a rubber bung 20. A thermometer 24 extends into the beaker through the bung 20. A gas outlet tube 26 extends through the bung 20 and through another bung 28 into a flask 30. A gas outlet 32 from the flask 30 also extends through the bung 28.

The beaker 22 contains a magnetic stirrer 34 and is supported on an electrical heater 36 which also actuates the magnetic stirrer 34.

In operation, with the apparatus arranged as shown, a magnesium oxide slurry 38 is placed in the beaker 22 and a magnesium oxide slurry, or sodium hydroxide slurry, designated 40 is placed in the flask 30.

The electrical heater 36 is actuated to heat the slurry 38 and actuate the stirrer 34 and $SO_2$ and air are fed to the beaker 22 along the pipelines 4 and 12 to bubble through the slurry 38 from the sparger 2.

As the mixture of $SO_2$ and air bubble through the slurry 38, $SO_2$ is absorbed in the slurry 38 by converting MgO in the slurry to $MgSO_4$, $Mg(HSO_3)_2$, $H_2SO_3$ and water soluble $MgSO_3$.

Any trace of $SO_2$ not absorbed in the slurry 30 passes along the pipeline 26 and is absorbed as it is bubbled through the slurry 40 in the flask 30.

In experiments to verify the present invention, different MgO slurry concentrations, ranging from about 3-10 wt %, were used in the beaker 22 and each slurry 38 concentration achieved the desired goal, i.e. to capture $SO_2$ from the air-$SO_2$ gas "mixture", at a temperature ranging up to about 50° C. depending on the SO₂ content in the gas mixture. The preferred slurry 38 concentration for the MgO scrubbing-KCl conversion process, however, was found to be about 8.27 wt % MgO at a temperature in the range 30° to 40° C. since it produced a solution that contained about 240-250 gr/liter MgSO₄ which could be used directly for the conversion of KCl to K₂SO₄.

Eight decimal twenty-seven (8.27) grams of technical grade MgO was measured into the graduated beaker 22 which was filled with water to the 100 ml mark. The small magnet 34 was placed in the slurry 38 and the beaker 22 was put on the electro-magnetic heater and stirrer 36. The beaker 22 was fitted with the rubber bung 20 in which there were three holes: one for tube 4 to the glass sparger 2, one for the thermometer 24 and the third to allow gas to escape along tube 26.

Air containing different amounts of SO₂ (0.1-12%) was successively passed through the MgO slurry 38 until it became a clear solution. The solution was analyzed for MgSO₄, MgSO₃, Mg(HSO₃)₂ and H₂SO₃ content using titrimetric (caustic, iodine) and gravimetric methods for analysis.

The results given in the following Table I were for experiments carried out on a 100 mls MgO slurry containing 8.27 MgO and an Air-SO₂ flow rate of 1.0 liter/minute. The slurry temperature at the beginning of experiments was 20° C. Entering Air-SO₂ temperature was 20° C. throughout the experiment.

TABLE I

| EXPERIMENTS (SO₂ Concentration in Air-SO₂ Gas Flow) | CHARACTERISTICS AND COMPOSITION OF CLEAR LIQUOR OBTAINED IN THE EXPERIMENTS | | | | | |
|---|---|---|---|---|---|---|
| | Temp °C. | pH | H₂SO₃ g/l | Mg(HSO₃)₂ g/l | MgSO₃ g/l | MgSO₄ g/l |
| Experiment (1) 0.5% (V) | 20 | 4.0 | 4.34 | 39.65 | 6.67 | 215.9 |
| Experiment (2) 1.0% (V) | 25 | 4.0 | 4.66 | 69.78 | 14.40 | 179.10 |
| Experiment (3) 3.0% (V) | 38 | 4.5 | 4.82 | 166.70 | 6.87 | 137.92 |
| Experiment (4) 5.0% (V) | 50 | 4.0 | 5.63 | 115.08 | 7.38 | 162.95 |

Referring now to FIG. 2, there is shown a filter flask 42 having a rubber bung 44 through which a valved burette 6 extends together with a pipeline 48, from a source of pressurized air (not shown), and a gas outlet tube 50. The flask 42 contains a magnetic stirrer 51 and is on a heater 52 which also actuates the stirrer 51.

The tube 50 contains a check valve 53 and extends through a rubber bung 54 to a sparger 56 in a beaker 58. A gas outlet tube 60 from the beaker 58 extends through the bung 54 and through a bung 62 into a flask 64. A tube 66 connected to a vacuum source (not shown) also extends through the bung 62. A thermometer 63 extends through the bung 44.

In operation, a slurry 68 from the apparatus shown in FIG. 1 and containing MgSO₄, Mg(HSO₃)₂, H₂SO₃ and water soluble MgSO₃ is placed in the flask 42, the burette 46 is filled with a solution 70 of H₂SO₄ and hydrogen peroxide 72 is placed in the beaker 58. The heater 52 is energized and a vacuum is applied through tube 66 to the flask 64.

Measured quantities of H₂SO₄ are released from the burette 70 into the slurry 68 which is heated to a temperature of at least 40° C. to produce MgSO₄+SO₂+H₂O from the slurry 68. SO₂ produced in the flask 42 passes along the tube 50 into the hydrogen peroxide 72 in the beaker 58 where it is converted into H₂SO₄. Any SO₂ vapour escaping from the beaker 58 along the tube 60 is passed through the filter flask 64 and to the vacuum.

In further tests to verify the present invention, 25 mls of the clear solution, obtained from the experiments using the apparatus shown in FIG. 1, was transferred into the 250 ml filter flask 42 and the flask 42 was fitted with the rubber bung 44. There were three openings in the rubber bung 44: one for the delivery tip of the burette 46, which contained sulphuric acid, the other for the glass tube 48 for aeration and the third to hold the thermometer 63.

The filter flask 42 containing the clear solution and the small magnet stirrer 51 was placed on the electrical heater 52 and heated thereby to 60° C. while the stirrer 51 was actuated. The filter flask 42 was attached, by the plastic tube 50, to the glass sparger 56 which was immersed into the closed, tall beaker 58 containing 30 mls hydrogen peroxide. The outlet from the tall beaker 58 was connected, through tube 60 by the other filter flask 64 to the vacuum system 66.

10" (254 mm) mercury vacuum was applied to the system and at least 5% in excess of the stoichiometric requirement of H₂SO₄ was added to the liquor to decompose MgSO₃ and Mg(HSO₃) to MgSO₄, SO₂ and H₂O. At the end of the decomposition, when bubble formation in the flask 42 ceased, a small amount of air was passed through the liquor to remove SO₂ trapped in the liquor.

The decomposed liquor was tested for excess H₂SO₄ concentration and then neutralized with MgO. Hydrogen peroxide, containing sulphuric acid, was titrated with 1.0N NaOH and the amount of SO₂ liberated during decomposition was calculated from the test result. The results of the tests are given in the following Table 2, wherein 25 mls of the clear liquors obtained in experiments 1 to 5 above were decomposed with concentrated sulphuric acid and the excess acid neutralized with MgO.

TABLE 2

| EXPERIMENTS (SO₂ Concentration in Air-SO₂ Gas Flow Used in Preparing the Clear Liquor) | SULPHURIC ACID ADDED TO DECOMPOSE CLEAR LIQUOR, SO₂ GENERATED DURING DECOMPOSITION AND MgSO₄ CONTENT OF FINAL LIQUOR | | | | | |
|---|---|---|---|---|---|---|
| | H₂SO₄ Added (g) | SO₂ Liberated (g) | MgO Added (g) | MgSO₄ g/l | pH | Temp °C. |
| Experiment (1) 0.5% (V) | 0.67 | 0.86 | 0.1 | 249.49 | 6.8 | 60 |
| Experiment (2) 1.0% (V) | 1.28 | 1.51 | 0.1 | 241.82 | 7.0 | 60 |
| Experiment (3) 3.0% (V) | 2.40 | 3.66 | 0.1 | 249.00 | 7.1 | 60 |
| Experiment (4) | | | | | | |

TABLE 2-continued

| EXPERIMENTS (SO₂ Concentration in Air-SO₂ Gas Flow Used in Preparing the Clear Liquor) | SULPHURIC ACID ADDED TO DECOMPOSE CLEAR LIQUOR, SO₂ GENERATED DURING DECOMPOSITION AND MgSO₄ CONTENT OF FINAL LIQUOR | | | | |
|---|---|---|---|---|---|
| | $H_2SO_4$ Added (g) | $SO_2$ Liberated (g) | MgO Added (g) | $MgSO_4$ g/l | pH | Temp °C. |
| 5.0% (V) | 1.66 | 2.27 | 0.1 | 246.06 | 6.9 | 60 |

In FIG. 3, there is shown a flow diagram for the removal of $SO_2$ from, for example, flue or smelter gas on an industrial scale.

In FIG. 3, the flue or smelter gas, with fly ash removed therefrom, is passed sequentially through scrubbers 74 and 76 where the gas is scrubbed with an aqueous slurry of MgO.

The slurry leaving scrubber 74 is collected in a thickener 78 where the solids are separated leaving a clear liquor. The clear liquor, which contains mainly $MgSO_4$ and different amounts of $Mg(HSO_3)_2$, $MgSO_3$ and $H_2SO_3$, is passed to a decomposer tank 80 where it is steam heated and treated with concentrated sulphuric acid to decompose $Mg(HSO_3)_2$, $MgSO_3$ and $H_2SO_3$ to $MgSO_4+SO_2$ and water.

The decomposed liquor, which is mainly $MgSO_4$, is passed to an aerator tank 82 where it is aerated with compressed air to remove $SO_2$.

$SO_2$ from the thickener 78, the decomposer 80 and the aerator 82 is passed to a sulphuric acid plant (not shown) for conversion to sulphuric acid.

Magnesium sulphate is pumped from the aerator tank 82 by pump 84 to a neutralizer tank 86 where MgO is added to neutralize any excess $H_2SO_4$ present in the solution. $MgSO_4$ is pumped by pump 87 to a conversion plant (not shown) for further treatment.

Underflow from the thickener 78, which is in the form of a slurry containing unreacted MgO and insoluble $MgSO_3$, is pumped by pump 88 to a make-up tank 90 where it is diluted with water, preferably that used to initially condition the flue or smelter gas, and fresh MgO is added.

The MgO slurry thus formed is pumped by pump 92 from the make-up tank 90 to the scrubber 76.

Underflow from scrubber 76 is pumped by pump 92 to scrubber 74.

In FIG. 4, there is shown a flow diagram of an industrial application of the present invention for the removal of $SO_2$ from a gaseous stream such as, for example, flue gas or non-ferrous smelter gases.

In FIG. 4, the flue or smelter gas is spray scrubbed with water in a conditioner 174 to cool the gas to ambient temperature and remove fly ash therefrom.

The cooled, scrubbed flue gas is then passed through an absorber 176 where it is scrubbed with a slurry of magnesium oxide for the removal of $SO_2$. Cleaned flue or smelter gas is released to atmosphere from the absorber 176 while the clear solution, containing mainly $MgSO_4$ and varying amounts of $Mg(HSO_3)_2$, $H_2SO_3$ and soluble $MgSO_3$, thus obtained is passed to the decomposer 178 wherein it is steam heated to about 40° C. to decompose the $H_2SO_3$ to $SO_2$ and $H_2O$. The $SO_2$ is passed to a sulphuric acid plant 180, where it is converted to sulphuric acid, or it is liquefied at 181 for use in, for example, paper pulp bleaching.

Sulphuric acid is then added in the decomposer 178 in an amount representing at least 5% in excess of the stoichiometric requirement to decompose $Mg(HSO_3)_2$ and $MgSO_3$ according to the equations:

$$MgSO_3+H_2SO_4 \rightarrow MgSO_4+SO_2+H_2O$$

$$Mg(HSO_3)_2+H_2SO_4 \rightarrow MgSO_4+2SO_2+2H_2O$$

The resulting $MgSO_4$ solution is then passed to a neutralizer 182 where excess $H_2SO_4$ present is neutralized with MgO to convert this free acid to $MgSO_4$.

The neutralized $MgSO_4$ solution is then passed to a crystallizer 184 where potassium chloride is added to convert the magnesium sulphate to magnesium chloride according to the equation:

$$2MgSO_4+2KCl+6H_2O \rightarrow K_2SO_4.MgSO_4.6H_2O+MgCl_2$$

The $MgCl_2$ thus produced is then removed in centrifuge 186 and passed with water to a neutralizer 188 while the remainder is passed to another crystallizer 190 where water and further potassium chloride is added to produce the reaction according to the following equation:

$$K_2SO_4.MgSO_4.6H_2O+2KCl \rightarrow 2K_2SO_4+MgCl_2+6H_2O$$

The slurry of crystals thus produced is then passed to a centrifuge 192 where the magnesium chloride solution is separated from the potassium sulphate crystals. The magnesium chloride solution is passed to the neutralizer 188 while the potassium sulphate crystals are dried in a drier 194 and passed for storage as a saleable product.

As shown, sulphuric acid from the sulphuric acid plant 180 is passed for use in the decomposer 178.

The magnesium chloride, at the neutralizer 188, is treated with calcined dolomite to produce magnesium hydroxide and calcium chloride according to the equation:

$$MgCl_2+CaO.MgO+2H_2O \rightarrow 2Mg(OH)_2+CaCl_2$$

The products are passed to a centrifuge 196 where the $Mg(OH)_2$ solids are separated and portions fed to the absorber 176, the neutralizer 182, and the remainder fed to a calciner 198 for conversion to MgO as a saleable product.

The calcium chloride solution is fed from the centrifuge 196 to an evaporator 198 where it is concentrated to a saturated solution and passed to a crystallizer 200 where the temperature is reduced to about 10° C. to crystallize the calcium chloride.

The solution containing the crystals is passed to a centrifuge 202 where the crystals are separated from the waste liquor and passed to a dryer 204 for producing dried calcium chloride as a saleable product.

To summarize, in the method according to the present invention, $SO_2$ is removed from a gaseous stream, such as flue gas and non-ferrous smelter gases, the $SO_2$ is absorbed in an aqueous slurry of magnesium oxide (MgO) 4.0 to 4.5 to produce a clear liquor at a pH in the range of about 3 to 5, which contains mainly $MgSO_4$ and varying amounts of $Mg(HSO_3)_2$, $H_2SO_3$ and soluble $MgSO_3$ depending on the concentration of $SO_2$ present in the flue or smelter gas and on the temperature of the scrubbing slurry. The clear liquor is brought to about 40° C. to decompose $H_2SO_3$ to $SO_2$ and $H_2O$, sulphuric acid is added in an amount representing at least 5% in excess of the stoichiometric requirement to decompose $Mg(HSO_3)_2$ and $MgSO_3$ according to the equations:

$$MgSO_3 + H_2SO_4 \rightarrow MgSO_4 + SO_2 + H_2O$$

$$Mg(HSO_3)_2 + H_2SO_4 \rightarrow MgSO_4 + 2SO_2 + 2H_2O$$

If excess $H_2SO_4$ is present in the $MgSO_4$ solution obtained above, the solution should be neutralized with MgO to convert the free acid to $MgSO_4$.

The sulphur dioxide produced may be converted to sulphuric acid, half of which may be returned to decomposition circuit and the other half may be marketed as a saleable product.

The magnesium sulphate may be converted to magnesium chloride according to the equations:

$$2MgSO_4 + 2KCl + 6H_2O \rightarrow K_2SO_4 \cdot MgSO_4 \cdot 6H_2O + MgCl_2$$

$$K_2SO_4 \cdot MgSO_4 \cdot 6H_2O + 2KCl \rightarrow 2K_2SO_4 + MgCl_2 + 6H_2O$$

Potassium sulphate crystallizes out of solution and upon drying is ready to be marketed, for example as fertilizer.

The magnesium chloride may be reacted with calcined dolomite resulting in magnesium hydroxide and calcium chloride according to the equation:

$$MgCl_2 + CaO \cdot MgO + 2H_2O \rightarrow 2Mg(OH)_2 + CaCl_2$$

After filtration of the slurry, half of the magnesium hydroxide may be returned to the absorption circuit, while the other half may be calcined to produce saleable MgO. The filtrate may be evaporated and calcium chloride is crystallized out of solution. After drying, the $CaCl_2$ crystals may be marketed as a saleable products.

I claim:

1. A method of removing sulphur dioxide from a gaseous stream, comprising:
   (a) contacting the gaseous stream with an aqueous slurry of magnesium oxide containing about 3-10%/w of magnesium oxide, so that $SO_2$ of the gaseous stream is absorbed by the aqueous slurry by converting MgO to an aqueous solution at a pH in the range of about 4.0 to 4.5 containing $MgSO_4$ and different smaller amounts of $Mg(HSO_3)_2$, $H_2SO_3$ and water soluble $MgSO_3$.
   (b) thoroughly mixing sulphuric acid with the aqueous solution at a $H_2SO_3$ decomposition temperature of at least 40° C. to produce $SO_2$ and $H_2O$ therefrom, the sulphuric acid being present in an amount representing at least 5% in excess of the total stoichiometric requirement of the aqueous solution to decompose $Mg(HSO_3)_2$ and $MgSO_3$ according to the reactions:

$$MgSO_3 + H_2SO_4 \rightarrow MgSO_4 + SO_2 + H_2O$$

$$Mg(HSO_3)_2 + H_2SO_4 \rightarrow MgSO_4 + 2SO_2 + 2H_2O,$$

(c) converting the sulphur dioxide produced in step 9b) to sulphuric acid by catalytic reaction with $H_2O$ and $O_2$ according to the reaction:
   $$SO_2 + \tfrac{1}{2}O_2 + H_2O \rightarrow H_2SO_4$$

wherein at least a portion of the $H_2SO_4$ thus produced is recycled to the reaction of step (b).

2. The method according to claim 1, wherein magnesium sulphate produced in step (b) is converted to magnesium chloride by thoroughly mixing therewith potassium chloride and $H_2O$ according to the following two stage process:
   (i) adding potassium chloride to produce the following reaction:

$$2MgSO_4 + 2KCl + 6H_2O \rightarrow K_2SO_4 \cdot MgSO_4 \cdot 6H_2O + MgCl_2$$

whereby the potassium sulphate, in the form of a double salt, is separated from the $MgCl_2$ and then,
   (ii) adding additional potassium chloride to the separated double salt suspended in water to produce the following reaction:

$$2KCL + K_2SO_4 \cdot MgSO_4 \cdot 6H_2O \rightarrow 2K_2SO_4 + MgCl_2 + 6H_2O,$$

then separating the $K_2SO_4$, which has crystallized from the solution, from the remainder.

3. A method according to claim 2, wherein calcined dolomite is added to the remainder to produce the following reaction:

$$MgCl_2 + CaO \cdot MgO + 2H_2O \rightarrow 2Mg(OH)_2 + CaCl_2$$
(aqueous solution), and the magnesium hydroxide separated from the calcium chloride aqueous solution.

4. A method according to claim 3, wherein a portion of the magnesium hydroxide is formed into an aqueous slurry and is recycled for use as the aqueous slurry of magnesium hydroxide in step (a), and the remaining magnesium hydroxide is calcined to produce MgO therefrom.

5. A method according to claim 3, wherein a portion of the $H_2O$ is removed from the calcium chloride aqueous solution to crystallize calcium chloride in the remaining $H_2O$, and then the crystallized calcium chloride is separated from the remaining $H_2O$ and dried.

6. A method according to claim 1, wherein the step (b) is carried out under a reduced pressure.

7. A method according to claim 1, wherein the aqueous magnesium oxide slurry contains about 8.27 %/w of magnesium oxide.

8. A method according to claim 1, wherein the gaseous stream is at ambient temperature.

9. A method according to claim 10, wherein fly ash has been removed from the gaseous stream.

* * * * *